No. 12,091. REISSUED MAR. 3, 1903.

F. W. DUNNELL.

RAILROAD CROSS TIE.

APPLICATION FILED JAN. 24, 1903.

Witnesses:
Katharine H. Dugan
Ina L. Fisk

Inventor:
F. W. Dunnell
by Geo. N. Goddard
Atty.

UNITED STATES PATENT OFFICE.

FREDERICK W. DUNNELL, OF SPRINGFIELD, MASSACHUSETTS, ASSIGNOR TO THE F. W. DUNNELL COMPOSITE LEATHER COMPANY, OF SPRINGFIELD, MASSACHUSETTS, A CORPORATION OF MAINE.

RAILROAD CROSS-TIE.

SPECIFICATION forming part of Reissued Letters Patent No. 12,091, dated March 3, 1903.

Original No. 683,734, dated October 1, 1901. Application for reissue filed January 24, 1903. Serial No. 140,440.

*To all whom it may concern:*

Be it known that I, FREDERICK W. DUNNELL, a citizen of the United States, and a resident of Springfield, Hampden county, Massachusetts, have invented certain new and useful Improvements in Railroad Cross-Ties, of which the following is a specification.

One object of this invention is to utilize a waste material, such as leather scraps and worn-out foot-gear, in the manufacture of railroad cross-ties, a further object being to provide a cross-tie of leather and metal plates suitably constructed which is simple, practical, and efficient in service.

The invention consists in the novel construction and combination of parts, as is hereinafter described, and defined in the claims.

Reference is to be had to the accompanying drawings, forming a part of this specification, in which similar characters of reference indicate corresponding parts in all the figures.

Figure 1:
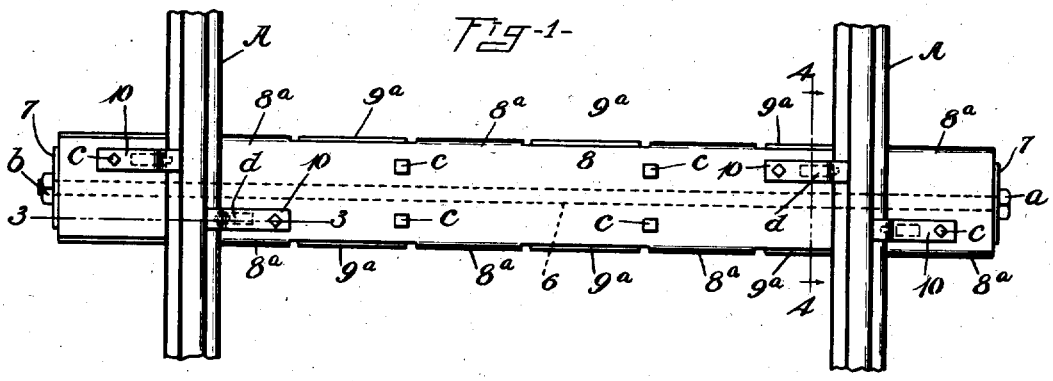
Figure 2:
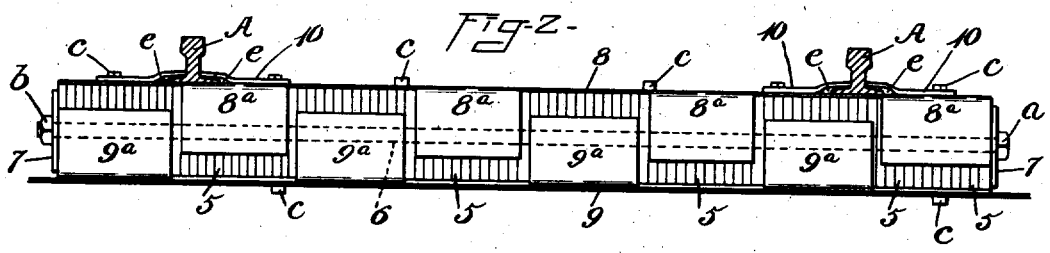
Figure 3:
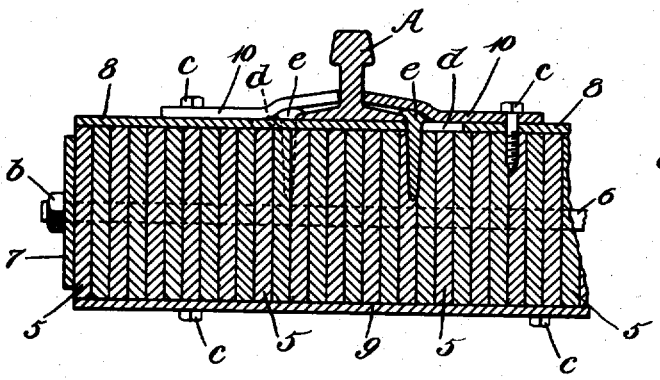
Figure 4:
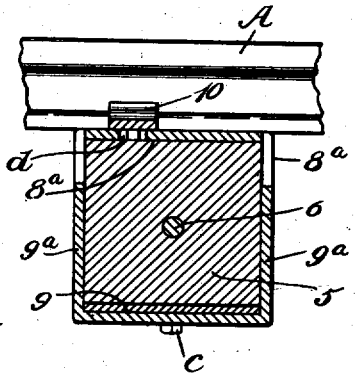

Figure 1 is a plan view of the improved cross-tie and portions of two track-rails mounted thereon. Fig. 2 is a side view of the same. Fig. 3 is an enlarged longitudinal sectional view substantially on the line 3 3 in Fig. 1, and Fig. 4 is a transverse sectional view substantially on the line 4 4 in Fig. 1.

In carrying into effect the features of invention a suitable number of similar blocks 5 are provided, these consisting of pulped and subsequently consolidated leather. As shown, said blocks each consist of a rectangular slab of proper thickness and area.

In order to utilize waste leather and worn-out boots and shoes in the manufacture of the blocks 5, such material is ground into pulp with a suitable liquid to form a plastic mass. This material is then formed into sheets that represent the thickness of the blocks, which are subsequently cut from the sheets into rectangular form, and then they are assembled to form a cross-tie, as follows:

The series of blocks 5 have each a central perforation formed therein, and a bolt 6 is passed therethrough, said bolt having a head *a* on one end and a nut *b* on the threaded opposite end of the same. The bolt 6 is of a length which conforms with the length of the cross-tie to be formed, and exterior of the blocks 5 at each end of the tie a washer-plate 7 is located on the bolt.

The assembled blocks 5 are arranged so that their edges will be disposed in four planes that represent respective sides of the cross-tie when it is completed, and the series of tie-blocks are now compressed against each other in sequence by a proper adjustment of the nut *b*, thereby producing a leather tie-body.

Upon opposite faces of the tie-body, which respectively represent upper and lower sides thereof, two similar metallic plates 8 9 are secured by bolts *c*, 8 being the cap-plate of the cross-tie, and 9 the base-plate thereof. The cap-plate 8 and base-plate 9 have each a plurality of flanges $8^a$ and $9^a$, respectively, formed thereon along their side edges at spaced intervals, and it is to be understood that any preferred number of said flanges may be employed. The width between opposite flanges on the cap-plate 8 and likewise on the base-plate 9 is such as will adapt these paired flanges to closely bear upon the side walls of the cross-tie body, and thus prevent the material of the body from yielding laterally.

Upon the cap-plate 8, at a proper distance from each end thereof, provision is made to retain track-rails A A in place on a plurality of the cross-ties of a railroad. To this end properly-positioned orifices *d* are formed in the cap-plate 8 for reception of the ordinary railroad-spikes *e*, which may be driven into the body of the tie at each side of each track-rail and bear with their hooked heads upon the base-flange of each track-rail in the usual manner.

To reinforce the binding action of the spikes *e*, two clamping-plates 10 are provided for each end portion of the cross-tie, said plates having one end portion of each one bent to adapt it to bear upon the head of an adjacent spike *e*, the remaining part of each clamping-plate, which is seated upon the cap-plate 8, being bolted thereon by screw-bolts that pass through registering perforations in the clamps and cap-plate, as indicated in Figs. 2 and 3.

The advantages inherent in a tie of this class are its moderate cost, due to its manufacture from refuse leather, its durability and imperviousness to moisture, and its elasticity under the strain of actual service. Moreover, it will be found to receive and hold the fastening-spikes with the utmost tenacity, while reducing the transmission of jar or vibration to a minimum, these being very important considerations in an article of this kind.

Having thus described my invention, I claim as new and desire to secure by Letters Patent—

1. A cross-tie, comprising a leather body, and plates of metal adapted to hold the body consolidated.

2. A cross-tie, comprising a series of leather blocks held together by a bolt to form a tie-body, and reinforced laterally by plates of metal secured on said body.

3. A cross-tie, comprising a series of leather blocks held together in sequence by a bolt and washer-plates thereon.

4. A cross-tie, comprising a series of rectangular leather blocks flat on the sides, said blocks each having a central orifice, a bolt and screw-nut, and washer-plates placed on the bolt near its ends after the leather blocks are located in sequence on the bolt-body, the leather tie-body being consolidated by an adjustment of the screw-nut.

5. In a cross-tie, the combination with a series of rectangular centrally-perforated tie-blocks, washer-plates at the ends of the cross-tie body, a bolt passing through the tie-blocks and washer-plates, and a screw-nut on an end of the bolt, of a cap-plate having depending flanges on its side edges, and a base-plate having like flanges, the flanges on said plates being arranged in alternate order and adapted to bear upon the sides of the tie-body.

6. A cross-tie comprising sections consisting of solidified leather combined with means for holding said sections firmly together.

7. A cross-tie comprising a body of compressed leather and a tie-rod extending through said body longitudinally thereof.

FREDERICK W. DUNNELL.

Witnesses:

ELVA H. YOUNG,

CHAS. L. YOUNG.